United States Patent [19]

de Niet

[11] 3,906,154

[45] Sept. 16, 1975

[54] SIGNAL TRANSMISSION SYSTEM

[75] Inventor: Edmond de Niet, Eindhoven, Netherlands

[73] Assignee: U.S. Philips Corporation, New York, N.Y.

[22] Filed: Nov. 20, 1973

[21] Appl. No.: 417,551

[30] Foreign Application Priority Data

Nov. 25, 1972 Netherlands ..................... 7216026

[52] U.S. Cl. ....................... 178/69.5 R; 178/DIG. 3

[51] Int. Cl.[2] ........................................ H04L 7/00

[58] Field of Search ..................... 178/69.5, DIG. 3; 179/15 BS

*Primary Examiner*—Charles E. Atkinson

*Assistant Examiner*—Errol A. Krass

*Attorney, Agent, or Firm*—Frank R. Trifari; Henry I. Steckler

[57] ABSTRACT

A facsimile signal transmission system including a transmitter in which a store provides a high frequency signal during signal repetition periods which signal is, for example, frequency-modulated. This signal is applied to a counting circuit in which a continuous count is effected with binary numbers associated with a plurality of outputs. A counting signal is applied each signal repetition period to a second counting circuit so that one binary number occurs at a plurality of outputs during each period. The first and second counting circuits are connected to a coincidence stage for supplying a signal in case of equal binary numbers to a transmission channel having a limited bandwidth to a receiver. The receiver includes a store for cyclically meshing storage of the received signal so that after a number of signal repetition periods equal to the maximum counting number of the counting circuits the high frequency signal is present in the receiver.

15 Claims, 2 Drawing Figures

SIGNAL TRANSMISSION SYSTEM

Figure 1:
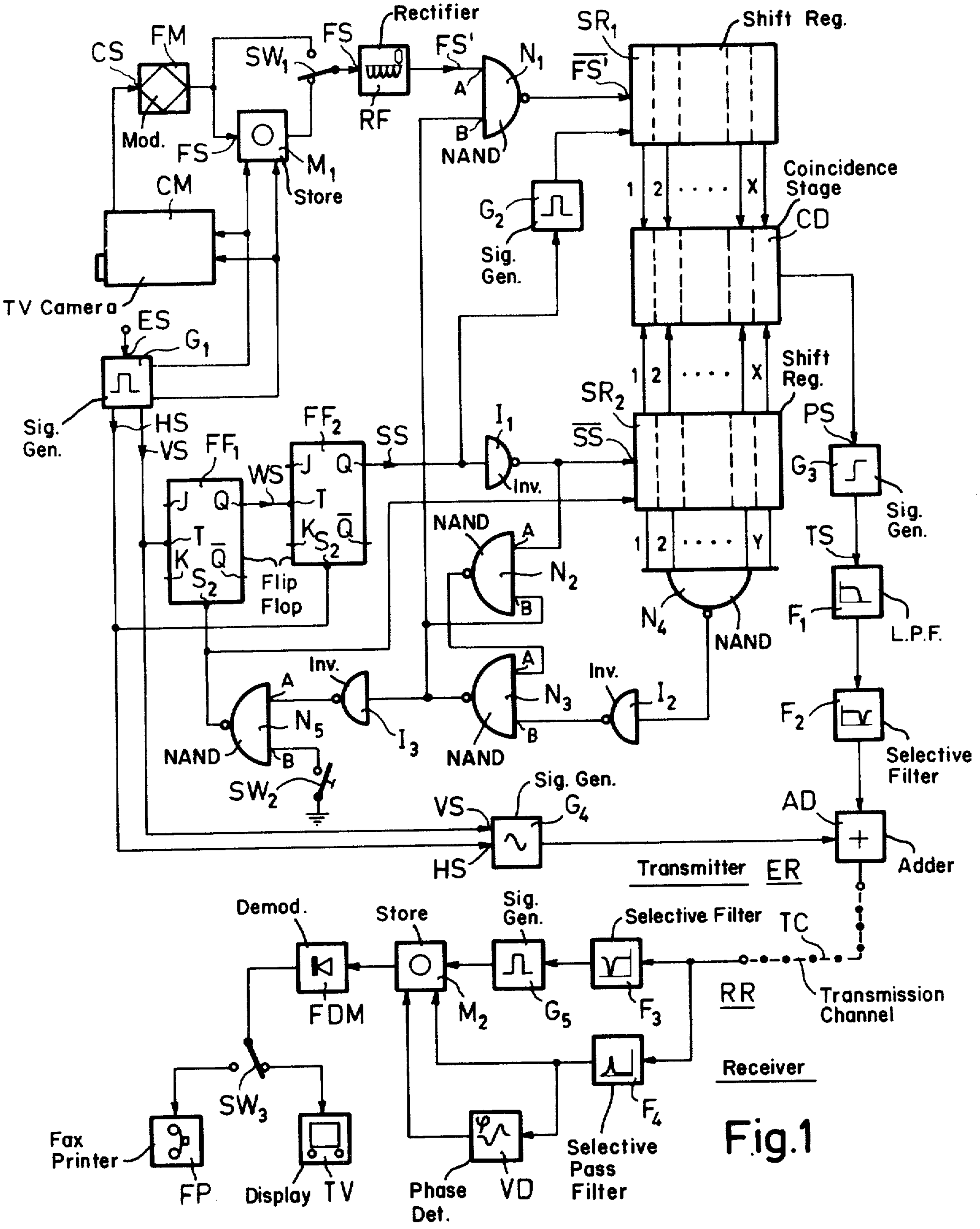

The invention relates to a signal transmission system comprising a transmitter conveying a high frequency signal, a transmission channel having a limited bandwidth and a receiver, said transmitter being provided with a store having an output which conveys in a cyclical manner in signal repetition periods the high frequency signal to be transmitted, and a circuit through which the store is connectable to the transmission channel during cyclically occurring relatively store time durations, the receiver being formed with a store connectable to the transmission channel for cyclically meshing storage of the transmitted signals, and to a transmitter and receiver suitable therefor.

Such a transmission system is described in German Auslegeschrift 1,907,700. It is stated that the high frequency signal in the transmitter is associated with a single television image which must be reproduced in the receiver after transmission through a telephone channel having a limited bandwidth.

In the transmitter the high frequency-signal occurs as a pulse code modulated signal which is stored in a magnetic tape memory and can be derived therefrom during signal repetition periods. The information of television image spots coded in acordance with the pulse code comprising shortlasting pulses is derived from the store during cyclically occurring relatively short durations corresponding to an image spot period and are converted into pulses of a comparatively long duration which occur during the remaining period of a cycle and are applied to the transmission channel. Starting from a signal repetition period of the store equal to one television image period a television line period is given for the cyclic connection period to the store. It is found that a group of shortlasting pulses providing the image spot information is converted into a subsequent equal group of long-lasting pulses occurring in one or more line periods.

In the receiver the received group of long-lasting pulses is converted into a group of short-lasting pulses stored as image spot information in the store which is filled in a cyclically meshing manner.

No detailed method has been given for the pulse conversion.

A drawback of the system described is that the pulse code providing the image spot information must be transmitted with pulses of a comparatively long duration but as such with an unchanged code. As a result strict requirements remain imposed on the bandwidth of the transmission channel because the code must not be perturbed.

An object of the invention is to provide a signal transmission system which does not have this drawback and in which a simple method of signal conversion is possible. To this end the transmission system according to the invention is characterized in that in the transmitter the output of the store conveying the high frequency signal is connected to an input of a counting circuit for counting signal transitions relative to a reference value present in the signal applied thereto, said counting circuit being provided with a plurality of outputs which dependent on the counted number of signal transitions convey a binary number, said transmitter furthermore including a second counting circuit having an input for the supply of a counting signal having a repetition period whose duration is equal to the signal repetition period of the high frequency signal and having a plurality of outputs which dependent on the counted number of signal transitions in the counting signal relative to a reference value convey a binary number, said pluralities of outputs of the first and second counting circuits being connected to respective inputs of a coincidence stage having an output connectable to the transmission channel for the supply of a signal in case of the same binary number present at the two pluralities of inputs of the coincidence stage, the store in the receiver being connectable to the transmission channel during a number of signal repetition periods which is equal to the said number of signal transition counts in the said first and second counting circuits for the cyclically meshing signal storage.

Figure 2:
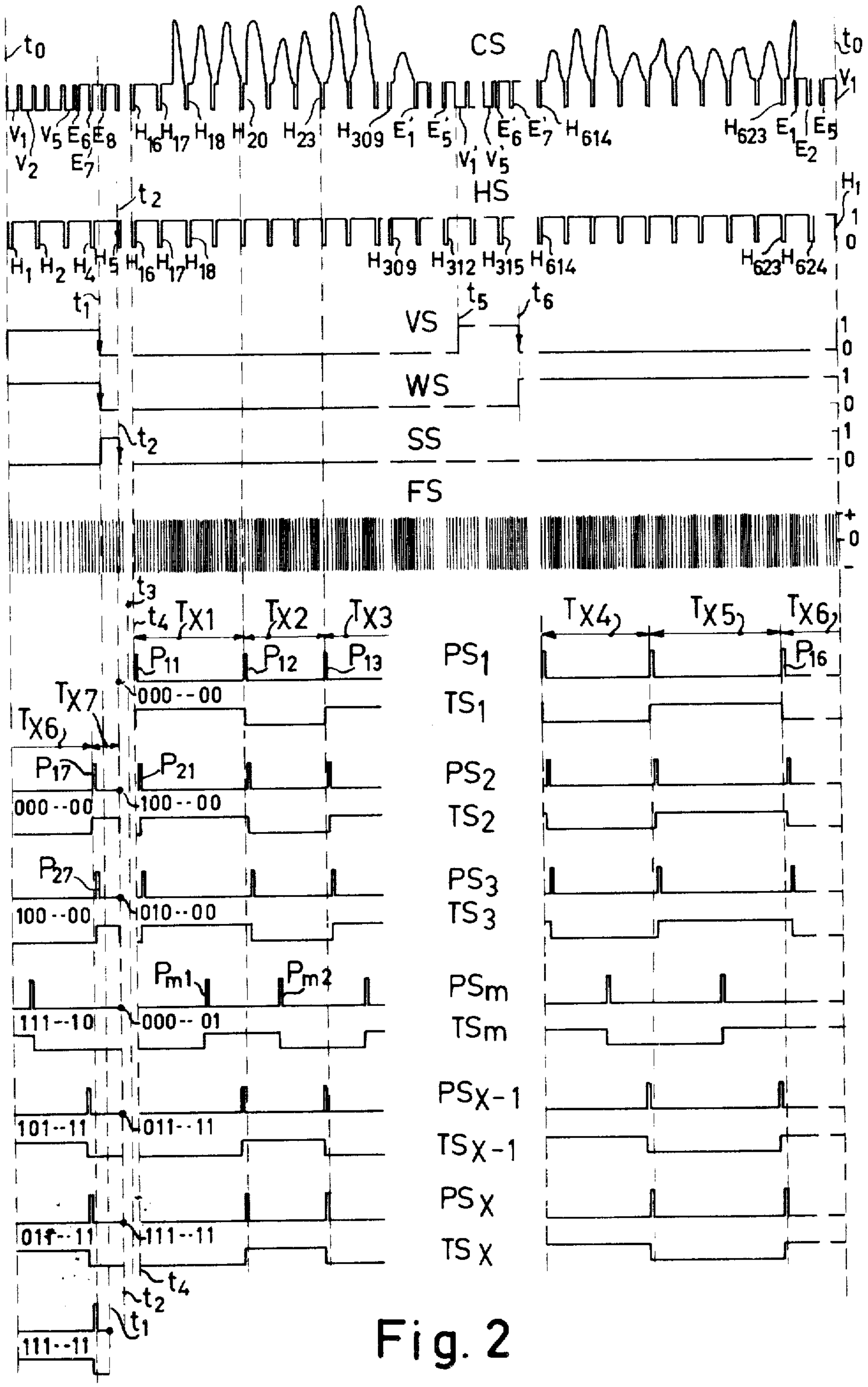

The invention will be described in greater detail by way of example with reference to the following Figures in which FIG. 1 diagrammatically shows a transmission system provided with a transmitter and a receiver according to the invention and FIG. 2 shows some signals indicated in FIG. 1 as a function of time.

In FIG. 1 the reference TC denotes a transmission channel which is present between a transmitter ER and a receover RR. The transmission channel TC may be, for example, a telephone channel or any other connection having a limited bandwidth. For a telephone channel there applies that it has, for example, an effective bandwidth of from 300 to 3400 Hz.

In the transmitter ER the reference CM denotes a television camera which provides a video signal CS under the control of signals provided by a signal generator $G_1$, which signals CS provides upon display information (not shown) picked up by the camera CM. The information to be transmitted is, for example, a photograph or a page of text and in this case the transmitter ER is a facsimile transmitter. For synchronisation purposes of the signal generator $G_1$ an external synchronising signal ES may be applied to an input thereof. The signal ES may have any desired form and may be, for example, a coded signal.

Some signals, inter alia, the video signal CS are plotted as a function of time in FIG. 2. The signals shown in FIG. 2 are drawn with an interrupted time axis. The video signal CS plotted in FIG. 2 is built up in accordance with a television standard using line interlacing and is drawn for two field periods constituting a picture period. The same signal CS occurs during each picture period. The television picture period is then the signal repetition period of the signal CS. The reference $t_0$ denotes a cyclically occuring instant which occurs as a starting instant and a final instant of each picture period. The starting instant $t_0$ is shown in an arbitrary manner at the beginning of a number of successive field synchronising pulses $V_1$, $V_2$ . . . The field synchronizing pulses V having a period equal to half a line period are followed by a number of post-equalisation pulses $E_6$, $E_7$, $E_8$ . . . having the same period. Subsequently three line synchronising pulses $H_{16}$, $H_{17}$, $H_{18}$ are shown which occur with one line period. During the remaining part of the line period the pulse $H_{16}$ is not followed by any image information, while the image information after pulse $H_{17}$ occurs as from approximately half the line period. Image information does occur after the pulse $H_{18}$ during substantially the entire line period. The so-called front and back porches which together with a line synchronising pulse constitute a line blanking period are left out of consideration in this case. The image information occurs between a so-called black level and a peak white value.

During the line period following a line synchronising pulse $H_{309}$ the last image information occurs in the field period starting at the instant $t_o$. The pulse $H_{309}$ is not followed by a line synchronising pulse but by a first of a number of pre-equalisation pulses $E_1' \ldots E_5'$. Subsequently the second field period with a field synchronising pulse $V_1'$ commences at an instant $t_5$. The references $E_6'$ and $E_7'$ denote the post-equilisation pulses following the last synchronising pulse $V_5'$. A line synchronising pulse $H_{614}$ is shown during the second field period whereafter furthermore some subsequent line periods with the image information are shown. A line synchronising pulse $H_{623}$ is followed by the image information during the first half of the line period whilst subsequently a first of a plurality of pre-equalisation pulses $E_1, E_2 \ldots$ occurs whereafter the first field synchronising pulse $V_1$ of the next picture period occurs at the cyclic instant $t_o$ in the signal repetition period.

The signal CS shown in FIG. 2 is associated with a standard using 625 lines in one picture period using two interlaced rasters. The field synchronising pulses V and the equalisation pulses E occur in numbers of five. Instead of the standard described, a 525-line standard with numbers of six field synchronising and equalisation pulses V and E might be taken alternatively. Apart from the irrelevant choice of the standard there applies that the camera CM provides the video signal CS in known manner under control of the signals provided by the signal generator $G_1$. In addition to the signals required for the camera control the generator $G_1$ provides a line synchronising signal HS and a field synchronising signal VS which are plotted in FIG. 2. In the signal HS a continuous series of line synchronising pulses $H_1, H_2 \ldots H_1$ is shown. The signal VS is shown with two pulses which occur between instants $t_o$ and $t_1$, and $t_5$ and $t_6$, respectively. The instant $t_1$ is chosen to be between the post-equalisation pulses $E_7$ and $E_8$ but it may alternatively occur earlier or later. If the instant $t_1$ corresponds to the beginning of the first post-equalisation pulse $E_6$, the pulse duration $t_o$ to $t_1$ is equal to two and a half line periods and thus covers not more than the interval during which the field synchronising pulses $V_1 \ldots V_5$ occur. If the signal VS is derived in known manner from the video signal CS by means of signal separation performed through integration, the edge at the instant $t_1$ remains present in the manner shown in FIG. 2 while the leading edge occurs after the instant $t_o$, The instants $t_5$ and $t_6$ of the second field period correspond to the instants $t_o$ and $t_1$ shown during the first field period. The signals VS and HS occurring as binary signals are accompanied by a comparatively high signal value with a logical 1 and a comparatively low value with a logical0, the logical 0 corresponding, for example, to the ground potential.

The video signal CS is generated by the camera CM as an analog signal with a bandwidth up to approximately 5 MHz so that the signal CS cannot be applied without any conversion for transmission to the transmission channel TC having, for example, a bandwidth of up to 3400 Hz. For a signal conversion to be performed in accordance with the invention the video signal CS is firstly applied to a modulator FM in which the signal CS modulates a carrier to be supplied by an oscillator so that the modulator FM provides a frequency-modulated signal FS. In FIG. 2 the signal FS is plotted between a + and a − value relative to a reference value 0. Dependent on the instantaneous value of the video signal CS the modulator FM supplies the signal FS with a given frequency. In the presence of the black level in the video signal CS a frequency of, for example, 7 MHz occurs in the signal FS, while 8 MHz occurs at the peak white value. The modulator FM thus has a frequency sweep of 1 MHz for the picture contents. When the synchronising and equalisation pulses V, H and E occur, a frequency of up to, for example, 6 MHz occurs. In FIG. 2 the comparatively high and the comparatively low frequencies in the signal FS are shown in a diagrammatical manner by means of a comparatively large and a comparatively small density of the carrier edges shown.

According to FIG. 1 the signal FS is applied to a first selection contact of a change-over switch $SW_1$ or to a store $M_1$ whose output is connected to a second selection contact of the change-over switch $SW_1$. The store $M_1$ is formed, for example, as a magnetic disc memory in which the signal FS is stored in a track on a rotating disc. For the purpose of synchronisation the store $M_1$ receives the control signals originating from the generator $G_1$ and also applied to the camera CM.

The store $M_1$ is used, for example, when the camera CM provides the signal CS during a single picture period only, whereas after conversion to the signal FS for a transmission to be further described it must be available for many picture periods. After storage in the store $M_1$ the signal FS may be derived from this store as many times as is desired during signal repetition periods. In the absence of the store $M_1$ the camera CM itself is to supply the video signal CS periodically occurring during many picture periods, which may be effected by forming a pickup tube in the camera CM also as a storage tube which provides the same signal CS after a single information pickup during each picture period as a signal repetition period. When using a camera CM provided with a conventionally used pick-up tube without the described storage action, the camera CM may be directed onto the unchanging information to be picked up for as many picture periods as is required.

The change-over switch $SW_1$ passes the signal FS originating from the modulator FM or from the store $M_1$ to a full-wave rectifier circuit RF. The circuit RF converts the signal FS of FIG. 2 into a signal FS' not shown. The positive-going oscillations (+) of the signal FS occur as negative going (−) in the signal FS' so that the peak white value of the video signal CS occurring with 8 MHz in the signal FS occurs with 16MHz in the signal FS'. The signal FS' is applied in FIG. 1 to an input A of an NAND-gate $N_1$ provided with a second input B which is interconnected in a manner to be further described. When the input B conveys a logical 0, the output of the gate $N_1$ conveys the logical 1. In fact, for the gate $N_1$ with the inputs A and B there applies that $0.0 = 1.0 = 1$. The gate $N_1$ is blocked. When the second input B of the gate $N_1$ conveys a logical 1, the output will convey the inverted signal FS' equal to $\overline{FS'}$ because there applies that $1.1 = 0$ and $0.1 = 1$.

The output of the gate $N_1$ is connected to an input of a counting circuit formed as a shift register $SR_1$ for counting signal transitions relative to a reference value present in the signal $\overline{FS'}$ applied thereto. Each leading edge in the signal $\overline{FS'}$ the value 0 as a reference value results in one step in the shift register $SR_1$ so that it conveys a binary number at 1, 2 . . . $x$ outputs thereof when it is formed with 1, 2 . . . $x$ stages as a function of the number of edges occurring in the signal $\overline{FS'}$ applied thereto. Starting from an initial position with a logical 1 at all outputs 1, 2, . . . $x$ of the shift register $SR_1$ a first leading edge or signal transition results in all outputs conveying the logical 0. The next leading edge results in the logical 1 occurring at the output 1. Starting from a binary count thus performed it follows for the 1, 2, 3 . . . $x$ outputs at the register $SR_1$ that: 000 . . . , 100 . . 1, 010 . . 0, 110 . . 0, 001 . . 0 etc. up to and including 111 . . 1 while at this last binary number all of which have logical ones $2^x$ signal edges have been counted. In this case it has been assumed for the sake of simplicity that the register $SR_1$ is completely utilised in all its counting possibilities which means that for an embodiment using $x$ stages there are $2^x = X$ binary numbers at the 1, 2 . . . $x$ outputs. As will be apparent from an embodiment to be described it may be desirable not to utilize the register $SR_1$ completely but only to a final number in which logical zeros occur at the outputs 1, 2 . . . $x$. In this case there applies that when X binary numbers must occur at the 1, 2 . . . $x$ outputs of the register $SR_1$, the value X is located between $2^{x-1}$ and $2^x$.

The outputs 1, 2 . . . $x$ of the register $SR_1$ are connected to the same plurality of inputs of a coincidence stage CD comprising $x$ stages. The coincidence stage CD is furthermore provided with a second plurality of inputs which are connected to outputs 1. 2 . . . $x$ of a second counting circuit formed as a shift register $SR_2$. The shift register $SR_2$ comprising $x$ stages and being, for example, identical to register $SR_1$, is provided with an input to which a signal $\overline{SS}$ to be described is applied. Signal transitions occurring relative to a reference value in the signal $\overline{SS}$ activate the counting mechanism in the register $SR_2$. The coincidence stage CD has an output for the supply of a pulsatory signal when the same binary number occurs at the said two pluralities of inputs 1, 2 . . . $x$ while the outputs 1, 2 . . . $x$ of the register $SR_2$ convey a determined number given by the counting signal $\overline{SS}$, while in the register $SR_1$ a continuous count is effected. The register $SR_1$ and the coincidence stage CD are active as a divider circuit ($SR_1$, CD) so that a single pulse is provided per cycle of X signal transitions in the signal $\overline{FS'}$. The divider circuit ($SR_1$, CD) thus has a division number X.

The following applies to explain the generation and the importance of the counting signal $\overline{SS}$. The output of the generator $G_1$ conveying the signal VS is connected to a trigger input T of a JK-flipflop $FF_1$. Preparatory inputs J and K of the flipflop $FF_1$ are free and each convey a logical 1 due to internal couplings. The handbooks comprising data on JK flipflops show that a given (leading or trailing) signal edge in the signal applied to the trigger input T causes the flipflop to reverse at J = K = 1 so that a logical 0 or 1 present at an output Q changes into a logical 1 or 0. The same is effected in case of an inverse Q-output in which simultaneously the logical 1 or 0 changes into a logical 0 or 1 For the flipflop $FF_1$ a reset input $S_2$ is shown. When the logical 1 occurs at the reset input $S_2$ the flipflop $FF_1$ is not influenced thereby; it is enabled. However, when the logical 0 occurs at the reset input $S_2$ the logical 0 is impressed on the Q-output and hence the logical 1 is impressed on the Q-output in a dominant manner independent of the signals present at the inputs T, J and K.

It is assumed that the signal VS shown in FIG. 2 is applied to the T-input of the flipflop $FF_1$ while trailing signal edges directed from the logical 1 to the 0 are active as trigger edges which trigger edges occurring at the instants $t_1$ and $t_6$ are provided with arrow heads. Furthermore the logical 1 is present at the Q-output and the $S_2$ input of the flipflop $FF_1$ prior to the instant $t_1$ in the cyclically occurring signals shown in FIG. 2. The signal edge in the signal VS at the instant $t_1$ causes the flipflop $FF_1$ to reverse so that the Q-output starts to convey the logical 0 as is plotted in FIG. 2 as a signal WS. The output Q ($FF_1$) conveying the signal WS is connected in FIG. 1 to the T input of a JK flipflop $FF_2$. The J and K inputs of the flipflop $FF_2$ are free and the $S_2$ input is connected to the output of the generator $G_1$ which conveys the signal HS. Prior to the instant $t_1$ the logical 1 and 0 occur in the signal HS at the $S_2$ input, while for the stable state of the flipflop $FF_2$ there applies that the logical 0 occurs at the Q-output. The trailing edge at the instant $t_1$ in the signal WS at the input T ($FF_2$) causes the flipflop $FF_2$ to reverse so that the logical 1 occurs at the Q-output as is shown in a signal SS occurring at the output Q ($FF_2$) in FIG. 2. The next trailing edge in the signal HS provides the logical 0 for the input $S_2$ ($FF_2$) so that the logical 0 is impressed on the output Q ($FF_2$). FIG. 2 shows that the line synchronising pulse $H_5$ causes the flipflop $FF_2$ to resume its stable state at an instant $t_2$. The trigger edge occurring at the instant $t_6$ in the signal VS causes the flipflop $FF_1$ to reverse so that the logical 1 appears in the signal WS. The logical 1 at the input T ($FF_2$) causes the flipflop $FF_2$ to be set to the position as is described for the signals WS and SS prior to the instant $t_1$. It is found that in each picture period between the cyclic instants $t_o$ a pulse having a duration of from $t_1$ to $t_2$ is generated in the signal SS. The signal SS and the inverse signal $\overline{SS}$ are active with their edges at the instant $t_2$ as a set signal and a counting signal, respectively.

In addition to the fact that the signal SS is active through an inverter $I_1$ as the signal $\overline{SS}$ is applied as the counting signal to the input of the register $SR_2$, it is applied to the input of signal generator $G_2$ which serves to provide a pulse at its output which is connected to a set input of the register $SR_1$. The trailing edge in the signal SS at the instant $t_2$ is active at the generator $G_2$ as a trigger edge and the generator $G_2$ thereupon provides a short-lasting pulse of, for example 2–3 $\mu s$ which pulse forces the register $SR_1$ to assume the position 11 . . . 1. The signal SS is then active as the set signal.

The signal SS originating from the inverter $I_1$ it furthermore applied to an input A of a NAND-gate $N_2$. The signal SS may alternatively be derived directly from the flipflop $FF_2$ through a connection to the Q - output. The output of the gate $N_2$ is connected to an input A of a NAND-gate $N_3$ whose output is connected, inter alia, to an input B of the gate $N_2$. An input B of the gate $N_3$ is connected to the output of an inverter $I_2$ whose input is connected to the output of a NAND-gate $N_4$. The gate $N_4$ has 1, 2 . . $y$ inputs which are connected to 1, 2 . . . $y$ outputs of the register $SR_2$. When completely utilising register $SR_2$ during which $2^x$ binary numbers may occur at the 1, 2 . . . $x$. outputs it will become apparent that $y$ is equal to $x$. When the register is not completely utilized, that is to say, when using a plurality of binary numbers between $2^{x-i}$ and $2^x$, $y$ is smaller than $x$.

The output of the gate $N_3$ is connected to the B-input of the gate $N_1$ and is furthermore connected through an inverter $I_3$ to an input A of a NAND-gate $N_5$. An input B of the gate $N_5$ is connected to ground through an on-off switch $SW_2$. The output of the gate $N_5$ is connected to the $S_2$-input of the flipflop $FF_1$ and to an input for blocking and releasing the register $SR_2$.

The output of the coincidence stage CD is connected to an input of a signal generator $G_3$ which provides a square-wave signal when pulses provided by the stage CD are applied. The generator $G_3$ is connected to an input of a lowpass filter $F_1$ which has, for example, a bandwidth of up to approximately 3 kHz and is active as a smoothing filter. The output of the filter $F_1$ is connected to a selective frequency cut-off filter $F_2$ which does not pass signals at a frequency of approximately 3 kHz. The output of the cut-off filter $F_2$ is connected to an input of an adder stage AD. A second input of the adder stage AD is connected to the output of a signal generator $G_4$ which is provided with two inputs to which the signals HS and VS, respectively, from the generator $G_1$ are applied. The generator $G_4$provides a sinusoidal signal at a frequency of, for example, 3 kHz and, as will appear, it serves for the supply of a synchronising signal. The output of the adder stage AD constitutes the output of the transmitter ER which is connected to the transmission channel TC.

Before describing the operation of the transmitter ER with reference to the signals shown in FIG. 2, the structure of the receiver RR is described. In the receiver RR the transmission channel TC is connected to a selective frequency cut-off filter $F_3$ and a selective frequency pass filter $F_4$ by which signals at a frequency of approximately 3 kHz are cut off and passed, respectively. The output of the filter $F_3$ which passes signals below 3 kHz is connected to a signal generator $G_5$ which provides short-lasting pulses whilst signal edges are applied. The output of the generator $G_5$ is connected to an input of a store $M_2$ in which the said short-lasting pulses are stored. For synchronisation purposes the store $M_2$ has two inputs connected directly to the filter $F_4$ and to this filter through a phase detector VD, respectively. The output of the store $M_2$ is connected to a demodulator FDM for demodulating frequency-modulated signals. The output of the demodulator FDM is connected to the master contact of a change-over switch $SW_3$ two selection contacts of which are connected to a television display apparatus TV and a facsimile printing device FP, respectively.

It is achieved in the signal transmission system according to the invention shown in FIG. 1 that the signal CS present in the transmitter ER is transmitted after conversion to the signal FS' with a maximum frequency of 16 MHz through the transmission channel TC having a bandwidth of up to 3400 Hz so that after storage in the store $M_2$ the store provides the signal FS' which yields the signals CS after demodulation for display in the receiver RR.

To explain the operation of the transmission system according to FIG. 1 the following applies. An initial state is taken as a starting position in which the store $M_2$ in the receiver RR is synchronized with the store $M_1$, or the signal generation in the camera CM in the transmitter ER. For synchronisation the signal generator $G_1$ applies the signals HS and VS to the signal generator $G_4$ which under the control of the signal HS provides a sinusoidal signal of 3 kHz while the signal VS inverts the phase of the sinusoidal signal between the one and the other field period. The 3 kHz synchronising signal is applied to the transmission channel TC through the adder stage AD whose other input does not receive a signal from filter $F_2$ at the initial synchronisation. In the receiver RR the 3 kHz synchronising signal is passed by the filter $F_4$ and is directly applied to the store $M_2$. The phase change described is then determined in the phase detector VD and is applied as field synchronising information to the store $M_2$.

In the construction of the stores $M_1$ and $M_2$ as disc memories only the 3 kHz synchronising signal which synchronises the rotational speed of the memory discs is required for the mutual synchronisation. Field synchronising information is not required in this case because the information present in a picture period as a signal repetition period in the duration of one rotation of the memory disc is stored in a track and this track can start at an arbitrary point. This is not the case when using a tape memory in which the start of a track must be determined accurately for repeated reproducing of one and the same tape section and for this purpose the field synchronising information must be present. The same applies when using a memory tube construction for the store $M_2$.

The signal transmission can take place after synchronisation of the stores $M_1$ and $M_2$ or of the camera CM and the store $M_2$. To this end the switch $SW_2$ is closed for some time.

Before closing the switch $SW_2$ the following applies for the various signals: the logical 1 occurs at all outputs $1, 2 \ldots y$ (and optionally the outputs $1, 2 \ldots x$) of the register $SR_2$. The output of the gate $N_4$ thus conveys the logical 0 which occurs as a logical 1 at the output of the inverter $I_2$. In case of a logical 0 at the output of the gate $N_3$ and hence at the input B of the gate $N_2$, its output conveys the logical 1 which occurs at the input A of the gate $N_3$. The logical 1 at the inputs A and B of the gate $N_3$ results in the logical 0 at the output. The logical 0 at the output of the gate $N_3$ causes the gate $N_1$ to be cutoff and the logical 1 occurs at the input A of the gate $N_5$. When the switch $SW_2$ is open, the logical 1 occurs at the input B so that the output of the gate $N_5$ conveys the logical 0. The logical 0 at the output of the gate $N_5$ maintains the flipflop $FF_2$ cut off due to supply to the $S_2$ while the logical 0 occurs at its Q output. The logical 0 at the output of the gate $N_5$ causes the register $SR_2$ to be cut off. The Q output of the flipflop $FF_2$ conveys the logical 0 because this state is stable when the signal HS alternately with the logical 0 and 1 is applied to the $S_2$ input. The logical 1 occurs at the output of the inverter $I_1$. The gates $N_1$ and $N_5$ and the inverters $I_2$ and $I_3$ constitute a blocking circuit ($N_1 \ldots N_5, I_2, I_3$). The inverter $I_1$ is left out of consideration in this case because the signal $\overline{SS}$ can be directly derived from the output $\overline{Q}$ ($FF_2$).

As a result of closing the switch $SW_2$ the input B of the gate $N_5$ is connected to ground and is thus impressed with the logical 0. The logical 1 appears at the output of the gate $N_5$ so that the flipflop $FF_1$ and the register $SR_2$ are enabled.

The next trailing signal edge in the signal VS causes the flipflop $FF_1$ to reverse. It has been described that before this instant the logical 0 occurs at the outputs Q ($FF_1$) and Q ($FF_2$) which corresponds for the signals WS and SS shown in FIG. 2 to the signal values occurring before the instants $t_5$ and $t_6$. At the instant $t_6$ the first trailing edge in the signal VS causes the flipflop $FF_1$ to reverse whereafter the logical 1 occurs in the signal WS. The next trailing edge in the signal VS occurs, periodically considered, at the instant $t_1$ denoted in FIG. 2. As a result the logical 0 occurs in the signal WS and the trailing edge causes the flipflop $FF_2$ to reverse whereafter the logial 1 occurs in the signal SS. The logical 1 in the signal SS remains present until the next pulse with the logical 0 in the line synchronising signal HS at the input $S_2$ ($FF_2$) forces the flipflop $FF_2$ to convey the logical 0 at the Q output. The trailing edge of the pulse $H_5$ in the signal HS at the instant $t_2$ according to FIG. 2 results in the trailing edge in the signal SS. Subsequently the flipflop $FF_2$ is in the stable state which is associated with the alternately occurring logical 0 and 1 at the $S_2$ input.

At the instant $t_2$ a leading edge occurs in the counting signal $\overline{SS}$ which edge activates the register $SR_2$ whereafter the binary number 000..00 occurs at the 1, 2 . . $x$ and 1, 2 . . . $y$ outputs of the register $SR_2$. As a result the output of the gate $N_4$ conveys the logical 1 and the logical 0 occurs through the inverter $I_2$ at the input B of the gate $N_3$. The output of the gate $N_3$ consequently conveys the logical 1 so that the gate $N_1$ is enabled and the logical 0 occurs through the inverter $I_3$ at the input A of the gate $N_5$. The opening of the switch SW after closure then does not have any consequences because the output of the gate $N_5$ maintains the logical 1 under influence of the logical 0 at its input A. For completeness sake it is to be noted that the logical 1 at the input B of the gate $N_2$ results in a logical 0 at the input A of the gate $N_3$ which has no further consequences. It is found that the blocking of the signal supply given by the blocking circuit ($N_1$ . . . $N_5$, $I_2$, $I_3$) to the first and second registers $SR_1$ and $SR_2$ is eliminated by a short closure of the switch $SW_2$.

The trailing edge in the set signal SS at the instant $t_2$ activates the signal generator $G_2$ into supplying a short-lasting pulse which sets the register $SR_1$ in the position with the logical 1 at all 1, 2 . . . $x$ outputs which is effected, for example, at an instant $t_3$ shown during an interruption in the time axis in FIG. 2. At the instant $t_3$ the register $SR_2$ conveys the binary number 000..00 . . 00 at the outputs 1, 2 . . . $x$ and the set register $SR_1$ is enabled by the generator $G_2$ so that the leading signal edges in the signal $\overline{FS'}$ activate the register $SR_1$ to a count starting from the position 111 . . 11.

In FIG. 2 the signals PS and TS shown in FIG. 1 are plotted over successive signal repetition periods with $PS_1$, $TS_1$; $PS_2$, $TS_2$ . . . $PS_m$, $TS_m$ . . . $PS_X$, $TS_X$. An instant $t_4$ is shown which for the signal $PS_1$ is assumed arbitrarily as a starting instant of a count to be considered, which instant $t_4$ occurs when the pulse $H_{16}$ occurs in the signal HS. The first leading signal edge in the signal FS' causes the number 000 . . 00 to occur at the outputs 1, 2 . . . $x$ of the register $SR_1$. The coincidence stage CD provides a pulse $P_{11}$ shown at the signal $PS_1$ because this number occurs at the outputs 1, 2 . . . $x$ of the register $SR_2$. Subsequently a continuous count is effected in the register $SR_1$ given by the leading edges in the signal FS' from 100 . . 00, 010 . . 00 up to and including 111 . . 11, etc. with subsequent cyclic of 000 . . 00 up to and including 111 . . 11, 000 . . 00 etc. It has been assumed for the sake of simplicity that the register $SR_1$ (and the register $SR_2$) are completely utilized with a count going from the maximum binary number at which the logical 1 occurs at all outputs 1, 2 . . . x. Since the register $SR_2$ is set with the number 000 . . 00 at the outputs 1, 2 . . . $x$, the coincidence stage CD provides a pulse whenever with the continuous count in the register $SR_1$ the same number occurs at its outputs 1, 2 . . . $x$. In FIG. 2 a time duration $T_{X1}$ is given for the signal $PS_1$ in which the register $SR_1$ has counted $2^x = X$ signal edges from the instant $t_4$ until the number 000 . . 00 occurs again at the outputs 1, 2 . . . x, which yields a pulse $P_{12}$. After the pulse $P_{12}$ a count again takes and after a time duration $T_{X2}$ a subsequent pulse $P_{13}$ occurs whereupon a subsequent time duration $T_{X3}$ starts. Likewise some time durations $T_{X4}$ and $T_{X5}$ are plotted. A time duration is plotted with $T_{X6}$ in which the periodical instants $t_o$ occurs after a pulse $P_{16}$ and subsequently a time duration $T_{X7}$ commences after a pulse $P_{17}$ and ends at the instant $t_2$.

FIG. 2 shows that the time durations $T_{X1}$, $T_{X2}$, $T_{X4}$ and $T_{X5}$ are unequal while during each of the periods the same number of X signal edges in the signal FS' are counted by the register $SR_1$. It is shown in the signal FS that the frequency varies as a function of the signal value in the video signal CS. As already described there applies, for example, that the negative going pulses in the signal CS yield a frequency of 6 MHz in the signal FS while the black level and the peak white value yield 7 and 8 MHz, respectively. Thus the time duration $T_{X1}$ is longer than $T_{X2}$ because only the black level succeeds the pulse $H_{16}$ in the signal CS while the image information is only present in the second half of the line period at the pulse $H_{17}$, whereas the image information is present to a large extent between the pulses $H_{20}$ and $H_{23}$. Likewise the time duration $T_{X4}$ is shorter than the time duration $T_{X5}$ due to the higher image signal values.

The pulses in the signal PS of FIG. 1 produce the square-wave signal TS through the signal generator $G_3$ and the reference $TS_1$ denotes the square-wave signal derived from the pulsatory signal $PS_1$ in FIG. 2. The signal generator $G_3$ may be incorporated in the coincidence stage CD so that it directly supplies the square-wave signal TS.

In FIG. 2 the reference $PS_2$ denotes the signal as is applied by the coincidence stage CD during the second picture period with the register $SR_2$ being in the position 100 . . 00 at the periodical instant $t_2$. The first pulse in the second picture period is denoted by $P_{21}$. The signal $TS_2$ is obtained through the generator $G_3$. During the third picture period the signals $PS_3$ and $TS_3$ are obtained. The reference $PS_m$ denotes a signal which is obtained in the picture period in which the register $SR_2$ conveys the binary number 000 . . 01 at the outputs 1, 2 . . . $x$. For the given enumeration of the picture periods and the signals PS and TS there follows that $m = 2^{x-1} + 1$ while the picture period occurs at approximately half the number of picture periods amounting to $X = 2^x$. It has been shown in the signal $PS_m$ that a first pulse $P_{m1}$ occurs after half of the time duration $T_{X1}$ while the reference $P_{m2}$ denotes the second pulse in the raster period which occurs before half the time duration $T_{X2}$. Its cause resides in the structure of the signal FS in which half the number of signal edges counted by the register $SR_1$ occur more to the end and to the commencement of the time durations $T_{X1}$ and $T_{X2}$, respectively. It is apparent from the signal CS with the black level following the pulses $H_{16}$ and $H_{17}$ that at the commencement of the time duration $T_{X1}$ a relatively low signal frequency of 7 MHz occurs in the signal FS while three times the peak white value with the relatively high signal frequency of 8 MHz occurs in the remaining time duration.

The signals $PS_{X-1}$ and $TS_{X-1}$ are associated with a picture period in which the register $SR_2$ conveys the binary number 011 . . 11 at the outputs 1, 2 . . . $x$. The references $PS_X$ and $TS_X$ denote the signals which occur in the picture period with the binary number 111 . . 11 which picture period is the last of a number of X picture periods in which the signal transmission takes place.

The gates $N_2$ and $N_3$ are provided to prevent the transmitter ER from switching itself off through the gate $N_4$ in the blocking circuit ($N_1$ . . . $N_5$, $I_2$, $I_3$) when the leading edge in the counting signal $\overline{SS}$ gives the binary number 111 . . 11 at the outputs 1, 2 . . . $y$ of the register $SR_2$ at the periodical instant $t_2$. The gates $N_2$ and $N_3$ thus constitute a hold circuit ($N_2$, $N_3$). At the instant $t_2$ when the leading edge occurs in the counting signal $\overline{SS}$ not only the binary number 111 . . 11 is given at the outputs 1, 2 . . . $y$ of the register $SR_2$ but also the logical 1 is impressed on the input A of the gate $N_2$. Since the logical 1 also occurs at the input B of the gate $N_2$, the output conveys the logical 0. The input A of the gate $N_3$ consequently conveys the logical 0 so that independent of the logical value at its input B the gate $N_3$ provides the logical 1 at its output. From the last considered instant $t_2$ the logical 1 occurs at the input B of the gate $N_3$ which is given by the binary number 111 . . 11 through the gate $N_4$ and the inverter $I_2$ as a blocking signal. The logical 1 remains present in the signal $\overline{SS}$ in the raster period with the binary number 111 . . 11 until the instant $t_1$ is reached after passing the periodical instant $t_0$. At this instant $t_1$ at the end of the signal repetition period with the number 111 . . 11 the logical 0 occurs in the signal $\overline{SS}$ which due to the supply to the input A of the gate $N_2$ supplies the logical 1 at its output. The logical 1 then occurring at the input A of the gate $N_3$ produces the logical 0 at the output with the logical 1 in the blocking signal at the input B. As a result the gate $N_1$ is blocked and the logical 1 occurs at the input A of the gate $N_5$. Since the switch $SW_2$ is open, the input B of the gate $N_5$ likewise conveys the logical 1 so that its output receives the logical 0 which due to the supply to the register $SR_2$ and the $S_2$ input of the flipflop $FF_1$ blocks both. Prior to blocking of the flipflop $FF_1$ the trailing edge in the signal VS has given the logical 0 in the signal WS at the instant $t_1$ which upon supply of the logical 0 to the $S_2$ input is further maintained. The trailing edge of the pulse $H_5$ in the signal HS which is applied to the $S_2$ input of the flipflop $FF_2$ causes the logical 0 to occur in the signal SS at the instant $t_2$. As a result the logical 1 is obtained in the counting signal $\overline{SS}$ through the inverter $I_1$, which logical 1 does not cause any count in the register $SR_2$ because this register is blocked by the logical 0 from the gate $N_5$ and thus remains in the position with the binary number 111 . . 11. It is found that after the signal repetition period with the binary number 111 . . 11 present as a maximum counting number in the register $SR_2$ the transmitter ER switches itself off and comes in the state which has been used as a starting point hereinbefore prior to closing the on-off switch $SW_2$.

The conversion of the pulsatory signal PS into the square-wave signal TS through the signal generator $G_3$ is effected for adaptation to the bandwidth of the transmission channel TC. The generator $G_3$ is active as a two-to-one divider and the highest frequency of the square-wave signal TS is to be within the bandwidth of the channel TC. The smoothing filter $F_1$ and the selective frequency cut-off filter $F_2$ cause the maximum frequency in the smoothed signal TS to be transmitted to be below 3 kHz. A sinusoidal signal of 3 kHz occurs at the output of the adder stage AD, but this originates from the signal generator $G_4$ for the described store synchronisation. The output of the stage AD applies the composite signal to the transmission channel TC.

In the receiver RR the smoothed signal TS is separated through the filter $F_3$ from the composite signal transmitted through the transmission channel TC. The signal generator $G_5$ yields short-lasting pulses under the control of the edges occurring in the smoothed received signal $TS_1$ . . . $TS_X$. As a result a signal which corresponds to the pulsatory signal $PS_1$ . . . $PS_X$ shown in FIG. 2 occurs at the output of the generator $G_5$, which signal is stored in the store $M_2$. A cyclically meshing signal storage is effected in store $M_2$. The result is that a store track for the signal storage is completely filled with the received information after a number of signal repetition or picture periods amounting to X ( $=2^x$). After the X number of picture periods a signal is present in the store $M_2$ which signal corresponds to the signal FS according to FIG. 2 where the influence of the rectifier circuit RF in the transmitter ER has not been taken into account, which influence will be described hereinafter. After the reception and storage of the signal in the store $M_2$ covering X picture periods the signal may be derived therefrom so as to provide a video signal after demodulation through the demodulator FDM, which video signal corresponds to the signal CS shown in FIG. 2. When the signal is applied to the television display apparatus TV the transmitted information can be displayed on a display screen by repeated reading of the store $M_2$. The signal supply may alternatively be effected through the change-over switch $SW_3$ to the printing device FP which provides a print, for example, after a single supply from the store $M_2$ of the text or the photograph as information.

In FIG. 2 the time duration $T_{X7}$ is shown which starts with the pulse $P_{17}$ and ends at the instant $t_2$. It is found that the time duration $T_{X7}$ is not determined by the signal contents of the signal FS with its signal edges such as the times $T_{X1}$ . . . $T_{X6}$ but is determined by the periodical final instant $t_2$ of a signal repetition period having a given binary number. In the signal TS associated with the periods of the binary numbers 000 . . 00 and 100 . . 00 the pulses $P_{17}$ and $P_{27}$ produce a square-wave signal lasting until the instant $t_2$. The duration of the square-wave signal is so short, i.e. the frequency is so high that the signal could not be transmitted through the transmission channel TC. The filter $F_1$ prevents the transmission exceeding 3 kHz in order that the store synchronisation is not perturbed. The result is that the signal stored in the store $M_2$ deviates from the signal CS shown in FIG. 2 because some information occurring before the instant $t_2$ is not transmitted. This is allowed because this information occurs during the field blanking period of a television standard. The receiver RR may be formed with a signal generator for applying a composite synchronising equalisation signal to the store $M_2$ which signal is added to the received signal. Instead of the transmission of the video signal CS with the synchronising and equalisation pulses, a pure image signal without there pulses but with a signal suppression in the field blanking period and the line blanking periods might be transmitted.

To illustrate the transmission system an example is given of an embodiment. The video signal CS with a maximum frequency of 5 MHz is converted into the frequency-modulated signal FS in which the black level corresponds to 7 MHz and the peak white value corresponds to the maximum frequency of 8 MHz. The store $M_1$ is a store having a range of up to 8 MHz. For the picture contents the frequency sweep is 1 MHz. Due to the full-wave rectifier circuit RF the positive going signal edges in the signal FS are converted into negative going ones so that the signal FS' and the inverse signal $\overline{FS'}$ obtain a maximum frequency of 16 MHz. In an embodiment of the transmission channel TC as a telephone channel having an effective bandwidth of from 300 to 3400 Hz, 2500 Hz is chosen for the maximum frequency of the signal TS present at the peak white value. The maximum pulse repetition frequency in the signal PS then is 5000 Hz. For the registers $SR_1$ and $SR_2$ a counting number of 16 MHz follows, divided by 5000 Hz which is equal to X = 3200. To this end the registers $SR_1$ and $SR_2$ are formed with $x = 12$ outputs because the maximum counting number X = 3200 must be larger than $2^{11} = 2048$. Instead of the registers $SR_1$ and $SR_2$ counting to their maximum possible number of $2^{12} = 4096$, they are limited to a counting of X = 3200 due to internal couplings which with the inclusion of the zero position results in 3199 yielding, as counted from the left to the right the binary number 111111100011 at the x = 12 outputs of the registers $SR_1$ and $SR_2$ as the maximum counting number. The register $SR_2$ is provided with $y = 9$ outputs which correspond to the first seven and the last two outputs of the said $x = 12$ outputs. For the maximum counting number X the logical ones at the nine outputs $y$ cause the gate $N_4$ in the blocking circuit ($N_1 \ldots N_4$, $I_2$, $I_3$) to supply the logical 0 as a blocking signal. The embodiment of the registers $SR_1$ and $SR_2$ as counting circuits with a counting number X = 3200 gives for each number of 3200 successively counted signal edges the transmission of one per picture or signal repetition period so that after all X = 3200 picture periods the entire signal is transmitted. In a television standard having an image frequency of 25 Hz or 30 Hz there follows that after 3200.1/25 = 128 seconds or 3200.1/30 = 106.6 seconds the information of an image has been transmitted.

The signal TS with a frequency of 2500 Hz for the peak white value and a frequency sweep of one eighth thereof, i.e. approximately 300 Hz for the picture contents is applied to the transmission channel TC. The synchronising signal originating from the generator $G_4$ is passed at 3000 Hz. Because the maximum frequency of the signal TS occurring after the filter $F_1$ is less than 3000 Hz the pulses shown in FIG. 2 in the time duration $T_{X7}$ and occurring with a higher frequency will not be transmitted. The maximum frequency of 3000 Hz is associated with a minimum period of 333 $\mu s$ which falls within six lines periods according to the television standard. Consequently no information is transmitted for approximately six line periods within the field blanking period, but this is allowed.

In the receiver RR the smoothed signal TS with 2500 Hz for the peak white value is converted through the pulse — supplying generator $G_5$ into a 5000 Hz pulsatory signal. The signal generator $G_5$ supplies, for example, pulses having durations of 30 ns. During X = 3200 picture periods the cyclically meshing signal storage is effected in the store $M_2$. When reading the disc memory $M_2$ with the same rotational speed of the disc as for the signal storage a frequency-modulated signal becomes available for display with a frequency for the peak white value of 5000 times 3200 which is 16MHz. After frequency demodulation a video signal for display becomes available in the receiver RR whose bandwidth goes as far as 5 MHz as is shown in the video signal CS present in the transmitter ER. If the full-wave rectifier circuit RF were not present in the transmitter ER, only a video bandwidth of up to 2.5 MHz would occur or on the other hand a register $SR_1$ would have to be used which is activated both by leading and trailing edges.

In the disc memory construction of the store $M_2$ one rotation per picture period is effected. The rotational frequency thus is 25 or 30 Hz so that 120 or 100 pulses per rotation can be utilized for synchronisation from the 3000 Hz synchronising signal.

Instead of using the described frequency modulation it is alternatively possible to use pulse code modulation. In this case stricter requirements are imposed on the stores $M_1$, $M_2$ which then must have a frequency range up to 100 MHz. Adapted thereto the registers $SR_1$ and $SR_2$ are to be formed with sufficient stages so as to reach a higher counting number.

When using a transmission channel TC having a less limited bandwidth than that of the described telephone channel such as, for example, a coaxial cable, the signal PS may directly be applied to the cable. The cable may then be incorporated in a time division multiplex system in which, for example, other information is provided by transmitter ER during the remaining period of the time durations $T_{X1}$, $T_{X2}$ . . . between the pulses $P_{11}$, $P_{12}$ . . . of FIG. 2.

What is claimed is:

1. A signal transmission system comprising a transmitter conveying a high frequency signal, a transmission channel having a limited bandwidth and a receiver, said transmitter comprising a store having an output which conveys in a cyclical manner in signal repetition periods the high frequency signal to be transmitted, and a circuit through which the store is connectable to the transmission channel during cyclically occurring relatively short time durations, the receiver comprising a store connectable to the transmission channel for cyclically meshing storage of the transmitted signals, the transmitter comprising a first counting circuit means coupled to said transmitter store output for counting signal transitions relative to a reference value present in the signal applied thereto, said counting circuit having a first plurality of outputs which dependent on the counted number of signal transitions convey a binary number, said transmitter furthermore including a second counting circuit having an input for the supply of a counting signal having a repetition period whose duration is equal to the signal repetition period of the high frequency signal and having a second plurality of outputs which dependent on the counted number of signal transitions in the counting signal relative to a reference value convey a binary number, a coincidence stage having respective inputs coupled to said pluralities of outputs of the first and second counting circuits and an output connectable to the transmission channel for the supply of a signal upon the same binary number being present at the two pluralities of inputs of the coincidence stage, the store in the receiver being connectable to the transmission channel during a number of signal repetition periods which is equal to the said number of signal transition counts in the said first and second counting circuits for the cyclically meshing signal storage.

2. A signal transmission system as claimed in claim 1, wherein the output of the store conveying the high frequency signal conveys a frequency-modulated signal.

3. A signal transmission system as claimed in claim 2, wherein the output of the store is connected through a full-wave rectifier circuit to the input of the first counting circuit.

4. A signal transmission system as claimed in claim 1, wherein for the purpose of synchronization of the store in the transmitter and that in the receiver the transmitter is provided with a signal generator connectable to the transmission channel for supplying a synchronizing signal having a frequency removed by a selective frequency cutoff filter between the output of the coincidence stage and the transmission channel from the signal to be supplied by the stage and that in the receiver a selective frequency pass filter is connectable to the transmission channel for separating the synchronising signal for the purpose of synchronisation of the store in the receiver.

5. A signal transmission system as claimed in claim 4, wherein the said signal generator in the transmitter provides the synchronizing signal with a phase change as a function of the said signal repetition period of the store in the transmitter and that the receiver includes a phase detector between the selective frequency pass filter and the store to be synchronized.

6. A signal transmission system as claimed in claim 4 wherein in the transmitter the output of the coincidence stage conveying a pulsatory signal is connectable to the transmission channel through a signal generator supplying a square-wave signal and a signal generator is incorporated in the receiver between the transmission channel and the store, which generator supplies short-lasting pulses under the control of the received signal for the purpose of storage in the store, the signal generator supplying the square-wave signal is connnectable to the transmission channel through the selective frequency cut-off filter and in the receiver the transmission channel is connectable to the signal generator providing the short-lasting pulses through a selective frequency cut-off filter having the same cut-off frequency as the filter in the transmitter.

7. A signal transmission system as claimed in claim 1, wherein in the transmitter the output of the coincidence stage conveying a pulsatory signal is connectable to the transmission channel through a signal generator supplying a square-wave signal and a signal generator is incorporated in the receiver between the transmission channel and the store, which generator supplies short-lasting pulses under the control of the received signal for the purpose of storage in the store.

8. A transmitter for conveying a high frequency signal in a transmission channel having a limited bandwidth, said transmitter comprising a store having an output which cyclically conveys in signal repetition periods the high frequency signal to be transmitted, means for coupling the store output to the transmission channel during cyclically occurring relatively short time durations, a first counting circuit means for counting signal transitions relative to a reference value present in the signal applied thereto, said counting circuit having an input coupled to said store output and a plurality of outputs which dependent on the counted number of signal transitions convey a binary number, a second counting circuit means having an input for receiving a counting signal having a repetition period whose duration is equal to the signal repetition period of the high frequency signal and having a plurality of outputs which dependent on the counted number of signal transitions in the counting signal relative to a reference value convey a binary number, and a coincidence stage means having first and second pluralities of inputs coupled to said pluralities of outputs of the first and second counting circuits and an output coupled to the transmission channel for the supply of a signal upon the same binary number being present at the two pluralities of inputs of the coincidence stage.

9. A transmitter as claimed in claim 8, wherein the transmitter includes a signal generator for applying synchronising signals to the store and to flipflops incorporated in the transmitter and supplying the counting signal for the second counting circuit and a set signal for the first counting circuit for setting the circuit in a given position.

10. A transmitter as claimed in claim 9, wherein a reset input of one of the said flipflops is connected to an automatic blocking circuit whose blocking can be eliminated by an on-off switch, said blocking circuit blocking the signal supply to the first and second counting circuits.

11. A transmitter as claimed in claim 10, wherein said second counting circuit comprises a third plurality of outputs and the automatic blocking circuit is formed with a gate having a plurality of inputs which are connected to said third plurality of outputs of the second counting circuit, said gate having an output means for providing a blocking signal when the maximum counting number thereof is reached by the count in the second counting circuit.

12. A transmitter as claimed in claim 11, wherein the blocking circuit includes a hold circit coupled to said gate output so that the blocking signal occurs at the end of the signal repetition period associated with the maximum counting number of the second counting circuit.

13. A receiver for receiving a high frequency signal cyclically transmitted in signal repetition periods in a transmission channel having a limited bandwidth, said receiver comprising a store means for cyclically meshing storage of the transmitted signals, and means for coupling the store means to the transmission channel during a number of signal repetition periods which is equal to a number of signal transition counts for the cyclically meshing signal storage.

14. A receiver as claimed in claim 13, wherein the store means comprises a disc memory connected through a frequency demodulator to a television display apparatus.

15. A receiver as claimed in claim 13, wherein the store means comprises a disc memory is connected through a frequency demodulator to a facsimile printing device.

* * * * *

UNITED STATES PATENT AND TRADEMARK OFFICE

CERTIFICATE OF CORRECTION

PATENT NO. : 3,906,154
DATED : September 16, 1975
INVENTOR(S) : EDMOND DE NIET

It is certified that error appears in the above-identified patent and that said Letters Patent are hereby corrected as shown below:

IN THE SPECIFICATION col. 2, line 26, cancel "receover" to -- receiver --;

col. 3, line 51, cancel the comma (,) and insert a period (.);

col. 5, line 12, change "000..., 100." to -- 000..0, 100. --;

col. 8, line 46, after "$S_2$" insert -- input --;

col. 9, line 43, cancel ".." (2nd occurr.);

line 44, cancel "00";

line 54, change "FS'" to -- $\overline{FS'}$ -- line 61, change "FS'" to -- $\overline{FS'}$ --;

col. 10, line 19, change "FS'" to -- $\overline{FS'}$ --;

UNITED STATES PATENT OFFICE

CERTIFICATE OF CORRECTION

Patent No. 3,906,154 Dated September 16, 1975

Inventor(s) Edmond De Niet

It is certified that error appears in the above-identified patent and that said Letters Patent are hereby corrected as shown below:

Column 16, Claim 12, line 2, "circit" should read -- circuit --.

Signed and Sealed this

Twenty-eighth Day of June 1977

[SEAL]

*Attest:*

RUTH C. MASON
*Attesting Officer*

C. MARSHALL DANN
*Commissioner of Patents and Trademarks*